Patented Nov. 4, 1947

2,430,313

UNITED STATES PATENT OFFICE 2,430,313

PROCESSES FOR COPOLYMERIZING MONO-ETHYLENIC HYDROCARBONS WITH COMPOUNDS OF THE MALEIC ANHYDRIDE TYPE

Charles A. Vana, Brecksville, Ohio, assignor to E. I. du Pont de Nemours & Company, Wilmington, Del., a corporation of Delaware No Drawing. Application October 27, 1943, Serial No. 507,888

9 Claims. (Cl. 260—78.5)

1

This invention relates to polymerization processes and more particularly to processes in which a mixture is made up comprising a monoethylenic hydrocarbon, a polymerization catalyst, an inert solvent having a boiling point below that of the monoethylenic hydrocarbon, and a compound reactive with the monoethylenic hydrocarbon and having the formula

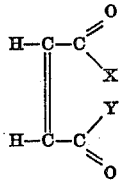

wherein X and Y stand for OH, O-alkyl, O-aryl, or halogen, or X and Y together stand for oxygen, the mixture is agitated and the temperature is raised until polymerization is initiated, whereby a co-polymer of the monoethylenic hydrocarbon and the compound reactive therewith is precipitated and heat of reaction is evolved, the temperature is caused to rise further to a point just below the fusion point of the co-polymer, agitation is then discontinued, and the temperature is caused to rise above said fusion point, but not above the boiling point of the solvent, until no further heat of reaction is evolved.

In United States Patent 2,286,062 to Condo et al., there are described certain advantageous catalytic methods for producing maleic anhydride-vinyl co-polymers. The methods therein described work well for relatively pure vinyl compounds, such as pure styrene, but difficulties are encountered when the vinyl compounds contain substantial amounts of contaminants. One such difficulty is that the reaction mass, at one stage of the polymerization, becomes taffy-like and is impossible to stir or otherwise to handle. This difficulty is encountered, for instance, when co-polymerizing maleic anhydride with crude styrene which is commercially available and which contains as contaminants a mixture of methyl styrene, other homologs of styrene, and indene and is formed by the high-temperature cracking of hydrocarbons. The present invention provides an improvement over the Condo et al. patent in that the present processes employ pure or crude styrene with equal facility.

Other methods have been described for polymerizing maleic anhydride and styrene without catalysts. In such methods the objective is usually to produce a structure which is useful by reason of its physical form; hence, the product is desirably hard, dense, and free from voids. Such methods, when using impure grades of styrene, are very slow until polymerization has been well started, then are extremely rapid, and unless positive measures are adopted to control the temperature, the reaction leads to gummy, heterogeneous masses which are of very high molecular weight and insoluble in alkaline solution. In contrast, the methods of the present invention produce a product which may be granular or powdery in form, which is of uniformly low molecular weight, and which is soluble in dilute alkalies.

It is an object of this invention to provide processes for producing homogeneous, alkali-soluble co-polymers of monoethylenic hydrocarbons and compounds reactive therewith and having the formula

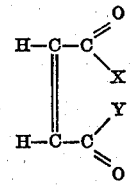

wherein X and Y stand for OH, O-alkyl, O-aryl, or halogen, or X and Y together stand for oxygen. Another object is to provide processes for catalytically co-polymerizing maleic anhydride with crude grades of monoethylenic hydrocarbons. Another object is to provide processes whereby difficulties heretofore encountered in producing homogeneous polymers from maleic anhydride and mixtures of monoethylenic hydrocarbons are obviated. Another object is to provide improved processes for co-polymerizing maleic anhydride with crude grades of styrene. Other objects will become apparent hereinafter.

The foregoing and other objects of this invention are accomplished by processes comprising making a mixture comprising a monoethylenic hydrocarbon, a polymerization catalyst, an inert solvent having a boiling point below that of the monoethylenic hydrocarbon, and a compound reactive with the monoethylenic hydrocarbon and having the formula wherein X and Y stand for OH, O-alkyl, O-aryl, or halogen, or X and Y together stand for oxygen, agitating the mixture and raising the temperature until polymerization is initiated, whereby a co-polymer of the monoethylenic hydrocarbon and the compound reactive therewith is precipitated and heat of reaction is evolved, causing the temperature to rise further to a point just below the fusion point of the co-polymer, discontinuing agitation, and causing the temperature to rise above said fusion point, but not above the boiling point of the solvent, until no further heat of reaction is evolved. The products of such improved processes are readily soluble in dilute aqueous alkali solutions, have relatively uniform molecular weights, and are in an easily handled pulverulent or granular form.

The processes of the present invention are applicable for use with any monoethylenic compound polymerizable with a compound of the formula

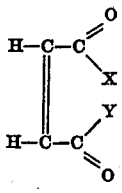

such as maleic anhydride. By "ethylenic group" is meant the radical

the valences of which may be satisfied by hydrogen or alkyl, aryl, or other substituent groups, or as a part of a ring structure. Specifically, the monoethylenic compound may be a material such as dipentene, diisobutylene, alpha- or beta-pinene, cetene, indene, vinyl esters, vinyl ethers, or methacrylic esters, and particularly meritorious results are obtained when the monoethylenic hydrocarbon is styrene, and especially crude styrene. It is preferred that the boiling point of the monoethylenic hydrocarbon be such that the material is a liquid at ordinary temperatures, else pressure must be used to contain the reaction mixture.

The solvent used in the reaction may be any inert liquid which is nonreactive with the reacting materials and the co-polymer produced. The boiling point of the solvent should be lower than that of the monoethylenic hydrocarbon, yet preferably should not be too low, that is, not below the fusion point of the co-polymer, in order to obviate the use of pressure equipment. Aromatic hydrocarbons, such as toluene, ethyl benzene, and especially, xylene, have been found to be effective solvents. The proportion of solvent should be sufficient to dissolve the reactants, but insufficient to hold the co-polymer formed in solution. A weight of solvent equal to from one to five times the weight of reactants gives good results for use with a crude styrene-maleic anhydride reaction mixture.

The polymerization catalyst used may be any material capable of accelerating the reaction between the olefinic compound and the compound reactive therewith. The art is already familiar with such catalysts. For instance, the organic peroxides described in the Condo et al. Patent 2,286,062, such as acetyl peroxide, ascaridole, dibutyryl peroxide, lauroyl peroxide, or succinyl peroxide, may be used to advantage, while benzoyl peroxide has been found particularly effective with styrene-maleic anhydride polymerizations. The benzoyl peroxide may be used advantageously in an amount from 0.1 to 3.0% based on the weight of the co-polymer.

Agitation is an essential aid in initiating the reaction and establishing control of the temperature throughout the batch. Polymerizations of the type here dealt with are highly exothermic and unless the batch be agitated, there will be a tendency to local overheating at the point where the reaction is first initiated. The agitation may preferably be of the kind obtained through the use of a sigma-arm type dough mixer, although other types of agitator adapted for doughy or plastic solids may be used.

According to this invention, it has been found that discontinuing the agitation at the proper temperature is extremely important. The reaction mixture advantageously may be agitated until the fusion point of the co-polymer being formed is almost reached; then agitation must be discontinued else the entire reaction mixture will become a gummy, unstirrable, unhandleable mass in which control of the degree of polymerization is impossible. Since the reaction is exothermic, heating is necessary only to initiate the polymerization; once it is started, the problem becomes one rather of dissipating the heat formed. The order of adding the reactants may be controlled to aid in securing the proper course of reaction, that is, the solvent and maleic anhydride may be added to the reaction vessel first, the monoethylenic hydrocarbon next, and the polymerization catalyst last.

The temperature at which to stop the agitation can be determined conveniently for any polymer by observing the power input to the agitator drive and its relation to batch temperature as polymerization proceeds. When the fusion temperature of the polymer is reached, a sharp increase in the power input of the agitator will be observed. At this point, the agitator should be stopped and polymerization allowed to proceed without agitation until the temperature has again dropped below this fusion point as the polymerization is complete. In the manufacture of subsequent batches of the same polymer, using the same crudes, the control of agitation can be based upon the temperature corresponding to the previously observed increase in power input. It is usually desirable to select a temperature slightly below that corresponding to the sharp load increase mentioned, since the character of the reaction mass changes extremely rapidly in this temperature range. With crude styrene as the polymerizable monoethylenic hydrocarbon, the temperature at which agitation should be stopped desirably may be about from 95 to 100° C.

After agitation has been discontinued, the temperature may be permitted to rise above the fusion temperature of the co-polymer. It may rise to, but preferably not above the boiling point of the solvent. The boiling of the solvent, in fact, furnishes an excellent control of the maximum temperature and, moreover, beneficially affects the character of the final product. When using xylene as the solvent, the temperature may be permitted to rise to about 138° C.

After heat evolution due to reaction has ceased, the batch preferably is cooled below the fusion temperature of the co-polymer and agitation is then resumed, whereby the mass is broken up into a granular or powdered form which is well adapted for dissolving in alkalies and for other handling.

The practice of the present invention will be better understood by reference to the following illustrative examples.

Example 1

Twenty-one hundred and forty (2140) grams of xylene was poured into a six-quart capacity stainless steel sigma-arm dough mixer and the mixing arms started. Five hundred and seventy-five (575) grams of maleic anhydride was then added. The mix was heated to about 80° C. and 1238 grams of a styrene intermediate (containing 49.3% unsaturates, calculated as styrene, and 50.7% xylene) was added. The unsaturates consist of about 40% styrene and 60% complex mixture of methyl styrene, other homologs of styrene, and some indene. The temperature of the mix was adjusted to 80° C. and 23.7 g. of benzoyl peroxide added to the reaction. A finely-dispersed polymer was first formed in the xylene. The temperature rose gradually, and as it attained approximately 96° C., the mixing mechanism labored under an increasing load. This indicated that the temperature had reached the fusion point of the polymer and the dispersed polymer particles had begun to agglomerate. The agitation was then stopped. The reaction continued to form more polymer with rise in temperature to a maximum of about 138° C., which was reached in 40 minutes. The temperature then gradually dropped, reaching approximately 100° C. one hour after the reaction was initiated. At this point, the mass was porous and crumbly; it readily broke up into small pieces. Agitation was therefore resumed. The polymer was easily digested with aqueous caustic solution to form a 25% solution of the half sodium salt of the polymer. A 95.4% yield was obtained based on the total unsaturates as styrene. The product was comparable to that obtained with relatively pure styrene according to the Condo et al. Patent 2,286,062.

The correlation between time, temperature, and agitation is clearly illustrated in Example 2.

Example 2

In this example a 20-gallon steel dough mixer equipped with sigma-type agitating arms was used as the reaction vessel.

Fifty and two-tenths (50.2) lb. of crude styrene (analyzing 49.5% unsaturates as styrene) was charged into the mixer, the mixer started, and 86.5 lb. of xylene and 23.3 lb. of maleic anhydride added. The charge was heated to 80° C. and 0.96 lb. of benzoyl peroxide was added. The following is a tabulation of the reaction conditions.

| Time of Reaction, Min. | Temperature °C. | Remarks |
|---|---|---|
| 0 | 81 | Catalyst Added. |
| 1 | 82 | |
| 2 | 82 | |
| 3 | 82 | |
| 6 | 90 | |
| 8 | 93 | |
| 10 | 96 | |
| 11 | 99 | Agitation was stopped when mixer began to labor due to partial fusion of polymer. |
| 12 | 100 | Vigorous reaction occurred with evolution of xylene vapors. |
| 14 | 109 | |
| 15 | | |
| 16 | 132 | |
| 17 | 135 | |
| 22 | 135 | |
| 27 | 138 | |
| 40 | 137.5 | |
| 55 | 133 | |
| 60 | 128 | |
| 78 | 118 | Agitation resumed to crush frangible mass. Polymer crushed to egg size, or smaller, lumps. |
| 109 | 83 | |

The polymer slurry from this batch was added to two other batches of equal size and the total polymer slurry was digested in an aqueous caustic solution to form the half sodium salt. Six hundred and fifty lb. of a 25% aqueous solution of the half sodium salt was prepared. A 95.3% yield was obtained based on the total unsaturates, as styrene, in the crude styrene.

While in the foregoing disclosure the present invention has been described with respect to certain specific processes, it will be understood that one skilled in the art, without departing from the spirit of the invention, may employ various processes.

I claim:

1. In a process for the production of a copolymer of maleic anhydride and styrene, the steps comprising making a mixture of maleic anhydride, styrene, and a peroxide polymerization catalyst in an inert solvent having a boiling point below that of styrene but not below the fusion point of the copolymer and which is a non-solvent for the copolymer, raising the temperature of the mixture while agitating it until polymerization is initiated, whereby a maleic anhydride-styrene copolymer is precipitated and heat of reaction is evolved, causing the temperature to rise further to a point just below the fusion point of the copolymer, then discontinuing agitation, and causing the temperature to rise above the fusion point of the co-polymer, but not above the boiling point of the solvent, until no further heat of reaction is evolved.

2. In a process for the production of a copolymer of maleic anhydride and styrene, the steps comprising making a mixture of maleic anhydride, crude styrene, and a peroxide polymerization catalyst in an inert solvent having a boiling point below that of the crude styrene but not below the fusion point of the copolymer and which is a non-solvent for the copolymer, raising the temperature of the mixture while agitating it until polymerization is initiated, whereby a maleic anhydride-styrene co-polymer is precipitated and heat of reaction is evolved, causing the temperature to rise further to a point just below the fusion point of the co-polymer, then discontinuing agitation, and causing the temperature to rise above the fusion point of the co-polymer, but not above the boiling point of the solvent, until no further heat of reaction is evolved.

3. In a process for the production of a copolymer of maleic anhydride and styrene, the steps comprising making a mixture of maleic anhydride, styrene, and a peroxide polymerization catalyst in an inert solvent having a boiling point below that of styrene but not below the fusion point of the copolymer and which is a non-solvent for the copolymer, raising the temperature of the mixture while agitating it until polymerization is initiated, whereby a maleic anhydride-styrene copolymer is precipitated and heat of reaction is evolved, causing the temperature to rise further to a point just below the fusion point of the copolymer, then discontinuing agitation, causing the temperature to rise above the fusion point of the co-polymer, but not above the boiling point of the solvent, until no further heat of reaction is evolved, and then resuming agitation, whereby the reacted mass is broken up.

4. In a process for the production of a copolymer of maleic anhydride and styrene, the steps comprising making a mixture of maleic anhydride, crude styrene, and a peroxide polymerization catalyst in an inert solvent having a boiling point below that of the crude styrene but not below the fusion point of the copolymer and which is a non-solvent for the copolymer, raising the temperature of the mixture while agitating it until polymerization is initiated, whereby a maleic anhydride-styrene co-polymer is precipitated and heat of reaction is evolved, causing the temperature to rise further to a point just below the fusion point of the co-polymer, then discontinuing agitation, causing the temperature to rise above the fusion point of the co-polymer, but not above the boiling point of the solvent, until no further heat of reaction is evolved, and then resuming agitation, whereby the reacted mass is broken up.

5. In a process for the production of a copolymer of maleic anhydride and styrene, the steps comprising making a mixture of maleic anhydride, styrene, and a peroxide polymerization catalyst in xylene, raising the temperature of the mixture while agitating it until polymerization is initiated, whereby a maleic anhydride-styrene copolymer is precipitated and heat of reaction is evolved, causing the temperature to rise further to a point just below the fusion point of the co-polymer, then discontinuing agitation and causing the temperature to rise above the fusion point of the co-polymer, but not above the boiling point of the xylene, until no further heat of reaction is evolved.

6. In a process for the production of a copolymer of maleic anhydride and styrene, the steps comprising making a mixture of maleic anhydride, styrene, and a peroxide polymerization catalyst in xylene, raising the temperature of the mixture while agitating it until polymerization is initiated, whereby a maleic anhydride-styrene copolymer is precipitated and heat of reaction is evolved, causing the temperature to rise further to a point just below the fusion point of the copolymer, then discontinuing agitation, causing the temperature to rise above the fusion point of the co-polymer, but not above the boiling point of the xylene, until no further heat of reaction is evolved, and then resuming agitation, whereby the reacted mass is broken up.

7. In a process for the production of a copolymer of maleic anhydride and styrene, the steps comprising making a mixture of maleic anhydride, styrene, and benzoyl peroxide as a polymerization catalyst, in xylene raising the temperature of the mixture while agitating it until polymerization is initiated, whereby a maleic anhydride-styrene co-polymer is precipitated and heat of reaction is evolved, causing the temperature to rise further to a point just below the fusion point of the copolymer, then discontinuing agitation and causing the temperature to rise above the fusion point of the co-polymer, but not above the boiling point of the benzoyl peroxide, until no further heat of reaction is evolved.

8. In a process for the production of a copolymer of maleic anhydride and a polymerizable monoethylenic hydrocarbon, the steps comprising making a mixture of maleic anhydride, a polymerizable monoethylenic hydrocarbon which is liquid at ordinary temperatures under atmospheric pressure, and a peroxide polymerization catalyst in an inert solvent having a boiling point below that of the hydrocarbon but not below the fusion point of the copolymer and which is a non-solvent for the copolymer, raising the temperature of the mixture while agitating it until polymerization is initiated, whereby a co-polymer of the maleic anhydride and hydrocarbon is precipitated and heat of reaction is evolved, causing the temperature to rise further to a point just below the fusion point of the co-polymer, then discontinuing agitation, and causing the temperature to rise above the fusion point of the copolymer, but not above the boiling point of the solvent, until no further heat of reaction is evolved.

9. In a process for the production of a copolymer of maleic anhydride and a polymerizable monoethylenic hydrocarbon, the steps comprising making a mixture of maleic anhydride, a polymerizable monoethylenic hydrocarbon which is liquid at ordinary temperatures under atmospheric pressure, and a peroxide polymerization catalyst in an inert solvent having a boiling point below that of the hydrocarbon but not below the fusion point of the copolymer and which is a non-solvent for the copolymer, raising the temperature of the mixture while agitating it until polymerization is initiated, whereby a co-polymer of the maleic anhydride and hydrocarbon is precipitated and heat of reaction is evolved, causing the temperature to rise further to a point just below the fusion point of the co-polymer, then discontinuing agitation, causing the temperature to rise above the fusion point of the co-polymer, but not above the boiling point of the solvent, until no further heat of reaction is evolved, and then resuming agitation, whereby the reacted mass is broken up.

CHARLES A. VANA.

REFERENCES CITED

The following references are of record in the file of this patent:

UNITED STATES PATENTS

| Number | Name | Date |
|---|---|---|
| 2,286,062 | Condo | June 9, 1942 |
| 2,230,240 | Gerhart | Feb. 4, 1941 |